(12) United States Patent
Zhou

(10) Patent No.: US 6,804,127 B2
(45) Date of Patent: Oct. 12, 2004

(54) REDUCED CAPACITANCE AC/DC/AC POWER CONVERTER

(75) Inventor: Dongsheng Zhou, San Jose, CA (US)

(73) Assignee: Wilcon Inc., Lake Oswego, OR (US)

( * ) Notice: Subject to any disclaimer, the term of this patent is extended or adjusted under 35 U.S.C. 154(b) by 0 days.

(21) Appl. No.: 10/299,268

(22) Filed: Nov. 19, 2002

(65) Prior Publication Data

US 2004/0095784 A1 May 20, 2004

(51) Int. Cl.[7] .............................................. H02M 5/458
(52) U.S. Cl. ............................ 363/37; 363/49; 363/51
(58) Field of Search .............................. 363/34, 35, 37, 363/49, 51

(56) References Cited

U.S. PATENT DOCUMENTS

| | | | |
|---|---|---|---|
| 4,646,222 A | 2/1987 | Okado et al. | |
| 4,843,533 A | 6/1989 | Roof et al. | |
| 5,157,574 A | 10/1992 | Tuusa | |
| 5,481,451 A | 1/1996 | Kuwahara | |
| 5,559,685 A | * 9/1996 | Lauw et al. | ................... 363/37 |
| 5,561,596 A | 10/1996 | Hemena et al. | |
| 5,623,399 A | 4/1997 | Ishii et al. | |
| 5,729,450 A | 3/1998 | Dimino et al. | |
| 5,825,639 A | 10/1998 | Wagoner | |
| 6,115,270 A | 9/2000 | Yamane et al. | |
| 6,169,672 B1 | 1/2001 | Kimura et al. | |
| 6,275,393 B1 | * 8/2001 | Baudelot et al. | ............... 363/37 |
| 6,449,181 B1 | 9/2002 | Rieger et al. | |

OTHER PUBLICATIONS

Kim et al, "AC/AC Power Conversion Based on Matrix Converter Topology with Unidirectional Switches," IEEE Transactions on Industry Application Jan./Feb. 2001, pp. 139–145.

* cited by examiner

Primary Examiner—Jeffrey Sterrett

(57) ABSTRACT

An AC/DC/AC power converter is constructed without using any electrolytic capacitor, such that it is more compact, durable and reliable. This converter only required a small capacitance for its DC link and this capacitor can be easily obtainable with other types of capacitors such as film or ceramic type. The system further includes means to disconnect both input and output to this DC bus capacitor. A controller capable of fast monitoring the DC bus voltage is also able of quickly disconnecting the capacitor out of either input or output energy path to prevent the capacitor from being charged to over-voltage. The controller also possesses capability of re-connecting the disrupted energy path once the DC bus voltage returns to normal.

14 Claims, 4 Drawing Sheets

REDUCED CAPACITANCE AC/DC/AC POWER CONVERTER

Federal Sponsored Research & Development

Not Applicable

BACKGROUND OF THE INVENTION

1. Technical Field of the Invention

The present invention relates generally to an alternate current to direct current and then back to alternate current (AC/DC/AC) power conversion system, and more particularly to an improved power structure coupled with a control means of an AC/DC/AC power conversion apparatus designed to convert fixed frequency AC source into variable frequency and variable voltage source for supplying power to an electric motor.

2. Background Arts

FIGS. 1 and 2 show power structures of conventional AC/DC/AC power converter for driving an AC motor. The converter typically includes a rectifier, a DC link and an inverter. Majority of ac drives do not need to provide regenerative feature and hence a diode rectifying front end is cost effective and suffices as the rectifier. The rectifier directs the AC power from the ac lines to provide power with a DC plus a six times line frequency component as input to the DC link capacitors. The inductor L on either the DC link or the input side is helpful in improving power factor of the power converter. The inverter modulates the DC voltage to generate variable frequency and variable voltage output to a motor.

The DC link capacitor section consists of at least two electrolytic capacitors C1 and C2 in series to have high enough voltage withstanding capability for the DC bus. Typical voltage rating for an electrolytic capacitor is about 450 VDC, not enough to work under a 650 VDC bus for an power converter. The series stack up of these electrolytic capacitors in turn requires the voltages across each capacitor to be equal and balanced. Such requirement is fulfilled by addition of R1 and R2 which may be made up by more than one single resistor to withstand enough watt loss. Resistors R1 and R2 supply a current leakage path to balance the capacitor voltages. R1 and R2 also serve to discharge C1 and C2 when the power converter is not in use. Capacitor C3 is either a type of film or ceramic capacitor whose capacitance is much smaller than provided by C1 and C2. C3 is primarily a snubber capacitor for mitigating any high voltage transient caused by high slope switching from within the inverter section.

There are drawbacks of conventional power converter using electrolytic capacitors:

A large capacitance electrolytic capacitor which must withstand a high level of DC voltage has a relatively limited operating lifetime. The effective operating lifetime of a power converter as whole will in general be determined by this smoothing electrolytic capacitor.

Breakdown of such an electrolytic capacitor can cause serious damage to other components of the power converter, since leakage of corrosive electrolyte may occur, or the capacitor may even explode.

Because of electrolytic characteristics, other components such as balancing resistors and high frequency film capacitor are required. These additional components increase not only cost but also board space to mount them.

The smoothing electrolytic capacitors occupy a relatively large amount of space within the power converter, thereby reducing the freedom available for mechanical design of the converter, and causing the overall size of the power converter to be large.

The power converter manufacturers and research community recognize above problem and realize improvement of AC drive product can be made if electrolytic capacitors are to be replaced. U.S. Pat. Nos. 5,729,450, 5,623,399, 6,115,270 and 6,449,181B1 propose to use film capacitor in place of electrolytic ones to provide ripple current capability to the inverter section. U.S. Pat. No. 5,623,399, U.S. Pat. No. 6,115,270 and U.S. Pat. No. 6,449,181B1 are invented for new electric vehicle applications where a battery is readily available to serve as a huge energy storage component in front of the inverter. The other patent U.S. Pat. No. 5,729,450 is in effect teaching for inverting energy from a fuel cell DC source to AC power. The fuel cell has low impedance and again serves as the huge energy storage and imposes smoothing effort on the DC link. Some of above patents, for example U.S. Pat. No. 5,729,450 claims that their approach also applies to conventional AC power converter product with a non-regenerative front end such as diode bridge. We would like to dispute here. If we assume that the energy storage component (in this case battery or fuel cell in stead of electrolytic capacitors) is taken away from the circuit, there is little energy storage capability left by the film capacitor on the DC link. Conventional AC power converter has working condition where transient energy can come back from the motor to the DC link. In this case the DC link is easily over charged, resulting in DC link over-voltage. This over voltage may damage the converter components such as the switching transistors. Thus their solution is not readily applicable to a conventional AC power converter with a diode front end rectifier.

U.S. Pat. No. 5,481,451 also proposes film capacitor in place of the electrolytic capacitors however only focuses on how to re-shape the inverter output voltage and current to the motor since the DC bus voltage is no longer only a DC value. As a matter of fact, the patent does not indicate requirement of the kind of front end rectifier and for the same reason as discussed in previous paragraph, we know that the taught technique in U.S. Pat. No. 5,481,451 alone will not work for an AC power converter with diode front end. Additionally this technique limits the output voltage transfer ratio to 0.866 which is not tolerable to most of the AC power converter products.

When energy comes back from the AC motor, the DC link voltage can easily be over voltage if the AC drive employs non-regenerative frond end such as a diode bridge. Such over-voltage can be suppressed by a snubber circuit. U.S. Pat. Nos. 6,169,672B1, 5,561,596, 5,157,574, 4,843,533 and 4,646,222 propose this kind of circuits with substantially more components either on DC link, ac input or output to suppress the over voltage spike. There are cases where active switch is employed and further requires active control from a controller. Complexity and part counts are increased and hence also the cost.

One particular solution for the DC link over voltage problem is to replace the non-regenerative diode front end with a regenerative-capable rectifier. Kim et al, in a technical paper "*AC/AC Power Conversion Based on Matrix Converter Topology with Unidirectional Switches*" published in IEEE Transaction on Industry Application of January/February 2001, pages 139–145, taught such solution. A regenerative capable rectifier usually consists of a boost type converter which utilizes active switches. Cost again is an issue for those applications that do not require regenerative feature.

U.S. Pat. No. 5,825,639 introduces a diode and a resistor to isolate the electrolytic and film capacitors. Such approach intends to let the film capacitor handle majority of the inverter ripple current and to reduce the stress to the electrolytic capacitors and their capacitance. However, a continuous loss through the additional resistor is present in order to render effectiveness from the electrolytic during transients. Besides the system suffers poor efficiency, additional diode and resistor also offset the cost saving from the reduction of electrolytic capacitance. Such arrangement is not able to deliver storage energy from the electrolytic capacitors during ride-through. The electrolytic capacitor, resistor and the diode taught by U.S. Pat. No. 5,825,639 is only a powerful over voltage clamp.

Part of above aforementioned inventions teaches inverter structure with reduced capacitance by addition of snubber circuit. The resultant power converter is costly, less efficient as well as bulky. Other part of above aforementioned inventions teaches reduced capacitance inverter to interconnect either to a large storage DC source or a regenerative rectifier. Both configurations results in either regulated or slow moving DC bus voltage. The speed to feedback this bus voltage is furnished by the controller of the power converter, and is not required as fast. When a non-regenerative rectifier is used in place of above large DC source or a regenerative rectifier and feeds input to this reduced capacitance inverter, the bus is neither regulated nor slow moving. DC bus voltage feedback quality by conventional controller deteriorates significantly during fast bus voltage transient.

Now it becomes apparent that none of above solutions is suitable or adequate to make a reduced capacitance DC/AC inverter capable of working with a non-regenerative diode rectifier. It is the objective of the present invention to overcome aforementioned drawbacks.

SUMMARY OF THE INVENTION

It is the objective of the present invention to construct AC/DC/AC power converter systems without using any electrolytic capacitor, such that the converter is more compact, durable and reliable. These converter systems only require a small capacitance easily obtainable with other types of capacitors such as film or ceramic type. The system further includes means to disconnect both input and output to the DC bus capacitor. A controller capable of fast monitoring the DC bus voltage is also part of the system. The controller is also able of quickly disconnecting the capacitor out of either input or output energy path to prevent the capacitor from being charged to over-voltage. The controller further possesses capability of re-connecting the disrupted energy path once the DC bus capacitor voltage returns to normal.

DESCRIPTION OF THE PREFERRED EMBODIMENTS

The invention will now be described in connection with certain preferred embodiments with reference to the following illustrative figures so that it may be more fully understood.

With specific reference now to the figures in detail, it is stressed that the particular shown are by way of example and for purpose of illustrative discussion of the preferred embodiments of the present invention only. They are presented in the cause of providing what is believed to be the most useful and readily understood description of the principles and conceptual aspects of the invention. In this regard, no attempt is made to show structural details of the invention in more detail than is necessary for a fundamental understanding of the invention. The description together with the drawings should make it apparent for those skilled in the art how the two forms of the invention may be embodied in practice. In the drawings:

FIG. 3a is the first embodiment of a reduced capacitance AC/DC/AC converter, showing an inverter connected to a non-regenerative diode rectifier via a LC filter on the DC bus. The controller has a fast feedback path from the DC bus and controlling paths for engaging the input and output to the link capacitor independently.

FIG. 3b shows a single phase AC rectifier configuration that can replace the three phase version 10 in FIG. 3a.

FIG. 3c shows an alternative precharge comprising of a semiconductor switch 21c.

FIGS. 3d to 3f shows various arrangements in the DC link.

Figure 5:
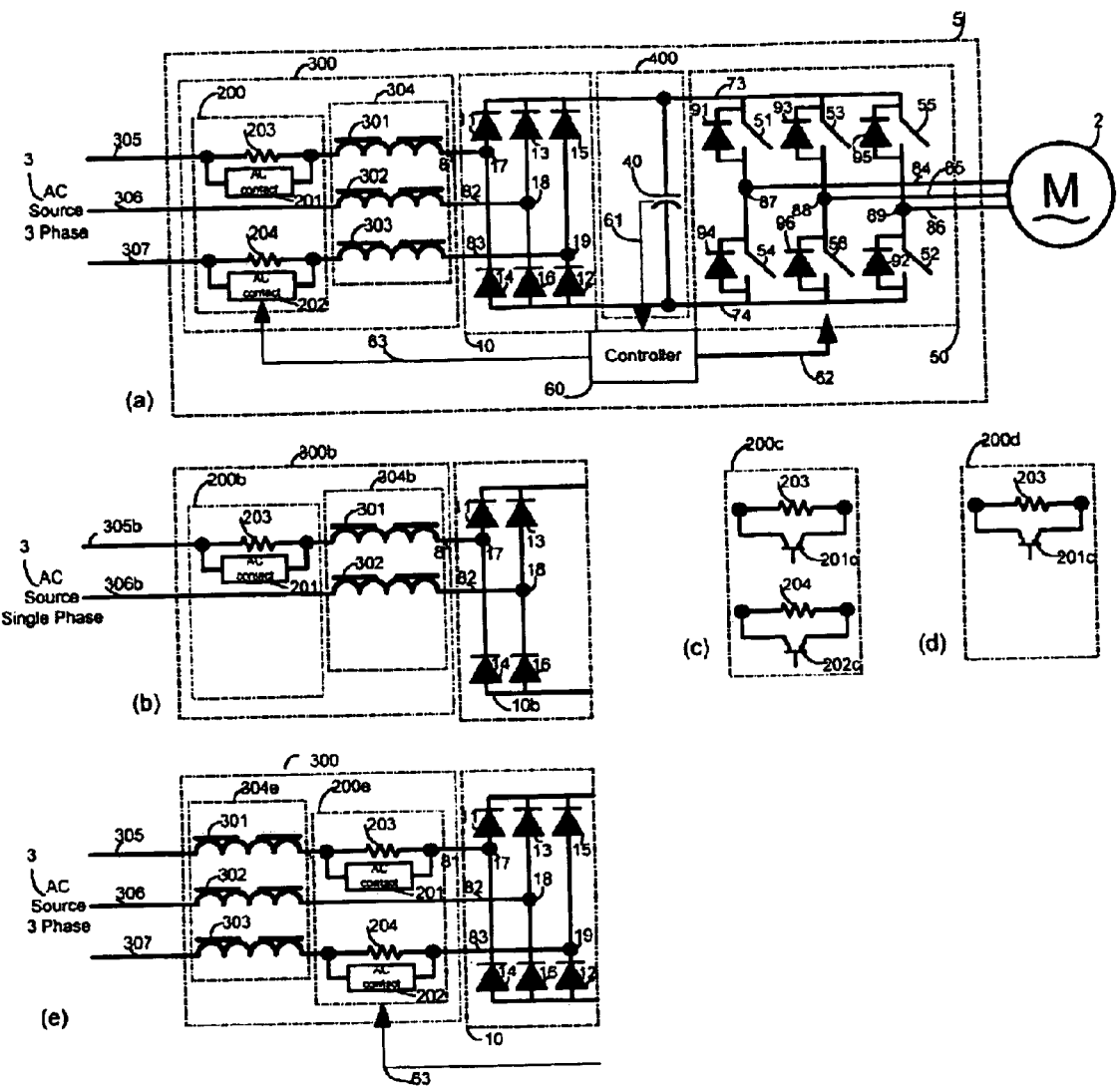

FIG. 5a is the second embodiment of a reduced capacitance AC/DC/AC converter, showing an inverter connected to a non-regenerative diode rectifier via a DC bus capacitor. An AC inductor between the AC input source and the non-regenerative diode rectifier forms the LC filter with the bus capacitor. The controller has a fast feedback path from the DC bus and controlling paths for engaging the input and output to the link capacitor independently.

FIG. 5b illustrates an arrangement to accept single phase AC source.

FIGS. 5c and 5d shows semiconductor switch in the precharge for three and single phase arrangements respectively.

FIG. 5e shows the precharge arranged between the AC inductor and rectifier.

DETAIL DESCRIPTION OF THE PREFERRED EMBODIMENTS

Figure 1:
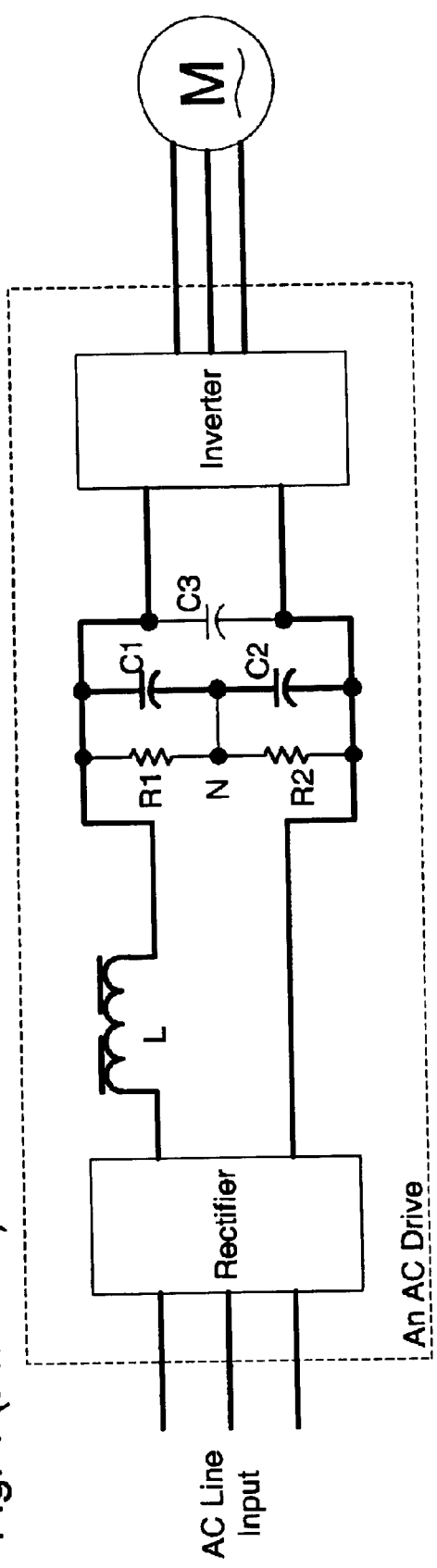
FIG. 1 is a prior art of conventional AC/DC/AC power converter showing details of its DC link structure consisting of electrolytic capacitors C1 and C2, their balancing resistors R1 and R2, a high frequency capacitor C3 and a DC inductor L.
Figure 2:
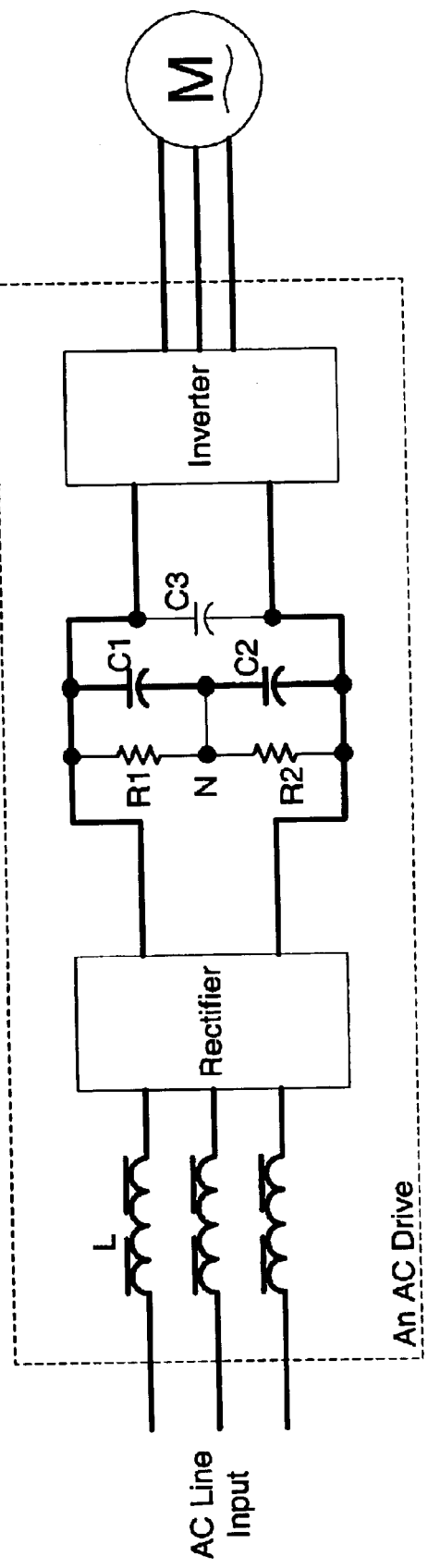
FIG. 2 is another prior art of conventional AC/DC/AC power converter showing details of its DC link structure consisting of electrolytic capacitors C1 and C2, their balancing resistors R1 and R2, a high frequency capacitor C3. The inductor is an AC one and now located on the input side.
Figure 3:
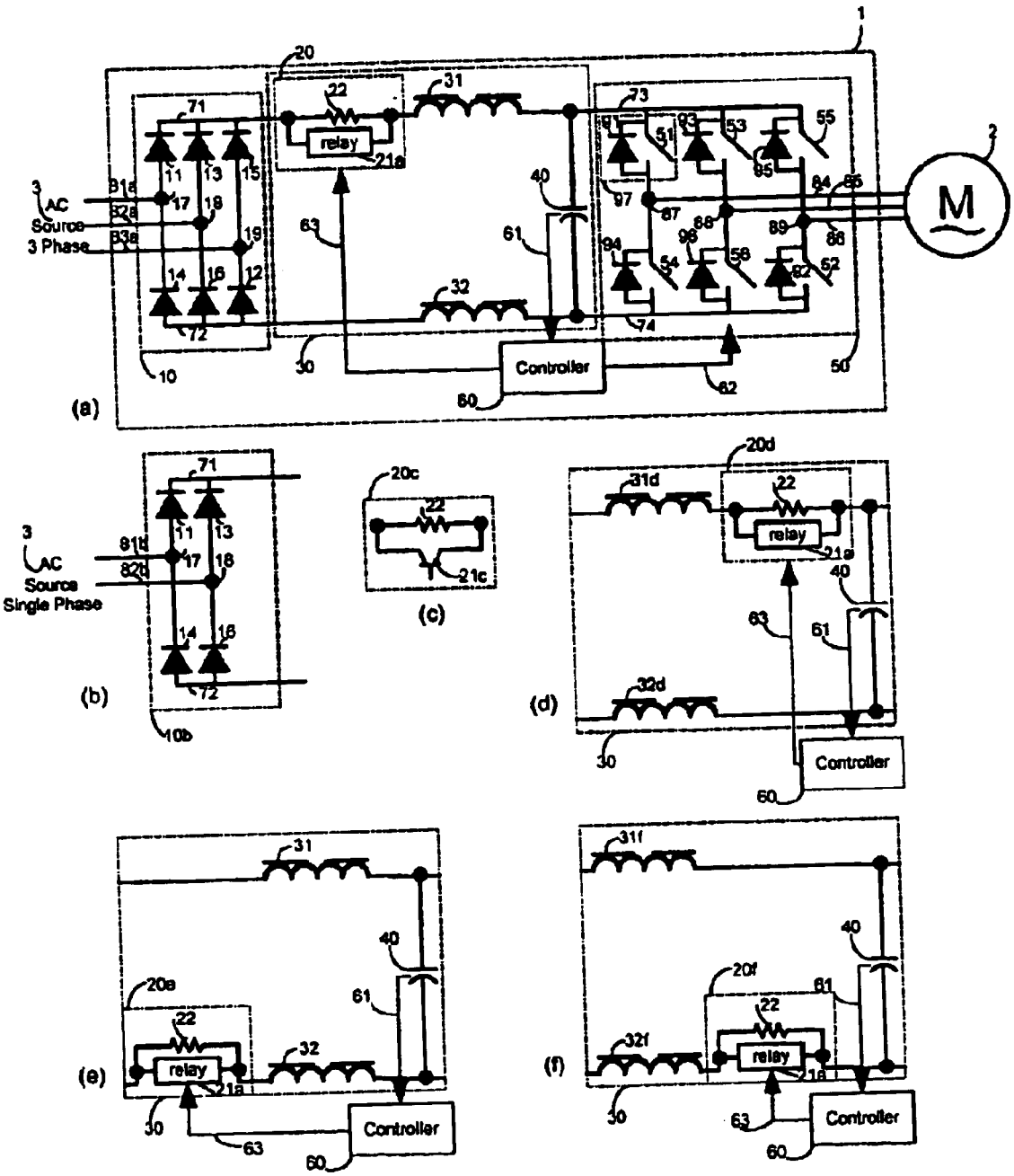

An AC/DC/AC power converter constructed according to the preferred embodiment of the present invention is indicated generally at 1 in FIG. 3a. A three-phase AC power source 3 supplies energy through wires 81, 82 and 83 to converter 1. Within converter 1, diodes 11–16 forms a unidirectional three-phase rectifier 10 only capable of passing the input energy from AC source 3 to the DC link 30, not vice versa. Cathodes of diodes 11, 13 and 15 are connected together to form a positive terminal 71. Anodes of diodes 14, 16 and 12 are tied similarly to form a negative terminal 72. Anode of diode 11 and cathode of diode 14 are connected together to wire 81 via node 17. Similarly anode of diode 13 and cathode of diode 16 joint to node 18 and connect to wire 82. Anode of diode 15 and cathode of diode 12 tie to node 19 and wire 83. Rectifier 10 rectifies ac voltage from AC source 3 and presents a voltage consisting of a DC average voltage plus multiples of $6^{th}$ harmonics between positive and negative terminals 71 and 72. Terminals 71 and 72 serve as the input points to DC link 30 of converter 1. When converter 1 is fed from a single phase AC source, three phase rectifier 10 in FIG. 3a can be replaced by a single phase rectifier 10b as illustrated in FIG. 3b. In FIG. 3b, single phase AC energy comes from wires 81b and 82b. Wires 81b and 82b connect to diodes 11 and 13 to form positive bus 71 and to diodes 14 and 16 to form negative bus 72.

DC link 30 consists of a precharge circuit 20, DC inductors 31 and 32, as well as a capacitor 40. A resistor 22 and a relay 21a are connected in parallel to form precharge circuit 20. Alternately the precharge circuit can be formed by substituting relay 21a with a semiconductor switch 21c like in FIG. 3c. When converter 1 starts up, capacitor 40 has zero or minimum initial voltage. Relay 21a is initially open enabling resistor 22 to be in the precharge path to limit the current inrush from AC source 3 via diode rectifier 10. Once capacitor 40 is charged, relay 21a is closed to provide major current path and hence to bypass resistor 22. Only after relay 21a is closed, converter 1 is allowed to delivery energy to its output, for example an electric motor 2. The rectifier positive output terminal 71 is connected to one end of precharge circuit 20.

Precharge circuit 20 is in series with inductor 31. Inductor 31 is arranged to be in the positive DC bus path. Inductor 31 is further connected to one side of the capacitor 40, forming a positive terminal 73 to an inverter section 50. The other side of the capacitor 40 is connected to another DC inductor 32, forming a negative node 74. Nodes 73 and 74 are the output terminals from DC link 30 to inverter 50. The other side of the DC inductor 32 is connected to negative terminal 72 of rectifier 10. It is understandable that inductors 31 and 32 can be constructed either in separate magnetic cores or in one core. In addition to possess differential inductances, inductors 31 and 32 may also be constructed to possess some common mode inductances impeding to any leakage current running through ground. Construction of such common mode impedance from the same core material from inductors 31 and 32 is well known in the art. It is also understandable that precharge circuit 20 is not limited to locate at the positive terminal 71 of rectifier 10 and before inductor 31. Its three other locations within DC link 30 are between inductor 31 and capacitor 40 (FIG. 3d), capacitor 40 and inductor 32 (FIG. 3f), as well as between inductor 32 and negative terminal 72 of rectifier 10 (FIG. 3e).

In order to avoid disadvantages from electrolytic capacitors and their associated circuit, a capacitor of other kind, such as film or ceramic, is used for capacitor 40. To have a voltage rise limit $\Delta V_{C\_limit}$ based upon maximum amount of ripple current $I_{ripple}$ required from inverter 50, capacitor 40 is selected with following formula:

$$C = \frac{I_{ripple} T_s}{\Delta V_{C\_limit}} \quad (1)$$

where $T_s$ is the switching cycle time within inverter 50. As an example, a 0.75 Hp, 460V electric motor requires 1A $I_{ripple}$, the capacitance is calculated to be 2.5 $\mu F$ if inverter 50 is to operate at 4 kHz and to allow a 100V DC voltage rise. A typical conventional AC/DC/AC drive incorporates 250 $\mu F$ capacitance, a total of 100 times higher value. A 2.5 $\mu F$ capacitor is easily achievable by material other than electrolytic.

Inverter section 50 takes the DC power from DC link circuit 30 via positive bus terminal 73 and negative bus terminal 74. Inverter 50 consists of six diodes 91–96 and six semiconductor switches 51–56, such as insulated gate bipolar transistors (IGBT). Switch 51, when gated on, can only conduct unidirectional current from top to bottom. Switch 51 blocks current from either direction when gated off. Diode 91 is connected to switch 51 in parallel such that diode 91 conducts free-wheeling current from bottom to top. Diode 91 and switch 51 form a diode-switch block 97. In similar manner the other switches 52–56 and diodes 92–96 are arranged for controlled and free-wheeling current paths. Two diode-switch blocks are connected in series to form a single leg, with their middle point serving as one of the inverter output. Since we have 6 diode-switch blocks, we can form three phase legs and have three output terminals 84–86. Via wires 84–86 output nodes 87–89 give variable frequency and magnitude power source to load of converter 1. The load of converter 1 can be, for example, an electric motor 2.

In order to complete an AC/DC/AC power converter system with reduced DC link capacitance, a controller 60 is further incorporated. Controller 60 is responsible for observing necessary system variables, such as output currents, DC link voltage and temperature etc. Based upon observed variation of these variables, controller 60 adjusts gating outputs to the controllable components in converter 1, i.e. switches 51–56 in inverter 50 and relay 21 in the precharge circuit 20. Normal control for converter 1 to deliver variable output voltage source is known in the art.

Since capacitance value of capacitor 40 within DC link 30 is reduced hundreds of times, there is little energy storage capability within converter 1. There are cases where energy flow through converter 1 can be disrupted and the DC bus voltage across capacitor 40 is charged up rapidly to its over-voltage range. This over-voltage on capacitor 40 also appears on inverter bridge 50 and may exceed voltage rating of individual semiconductor device, resulting in damage and hence malfunction of converter 1. One scenario where DC link voltage may rise to its over-voltage range occurs after line loss. Since AC power energy at input of converter 1 is not guaranteed to be available all time, there is occasion when AC power source 3 losses its energy for a portion of time, usually comparable to its frequency cycle (16 ms for 60 Hz utility). During this line loss interval, converter 1 continues to supply power to its load 2, depleting energy out from capacitor 40 quickly. Consequently DC bus voltage across capacitor 40 drops very fast. Conventional converter stores enough energy with much bigger electrolytic capacitors in DC link 30, allowing a much slower depletion, hence slower DC bus voltage drop. Conventional controller is designed to work with such slow moving DC bus voltage and hence is slow reacting to such fast transient if used for reduced capacitance power structure. When the AC power source 3 recovers, relay 21 may be still closed with such conventional controller. At this moment AC power source 3 is to charge the capacitor 40 from a low initial voltage, resulting in high inrush current and fast voltage swing to over-voltage range.

In order to prevent above fast rising over-voltage, energy flow path to capacitor 40 has to be disconnected by fast controller action. For example, controller 60 is to open relay 21 as soon as the bus under-voltage is detected. Bus under-voltage is an indication of line loss condition. This requires a fast and accurate link voltage feedback path 61, preferably in tens of micro-seconds respond time. Typical conventional bus feedback takes in ten of milliseconds feedback time. Controller 60 will turn off switches 51–56 if it judges that the bus over-voltage is due to energy back flow from load 2 via inverter 50.

Figure 4:
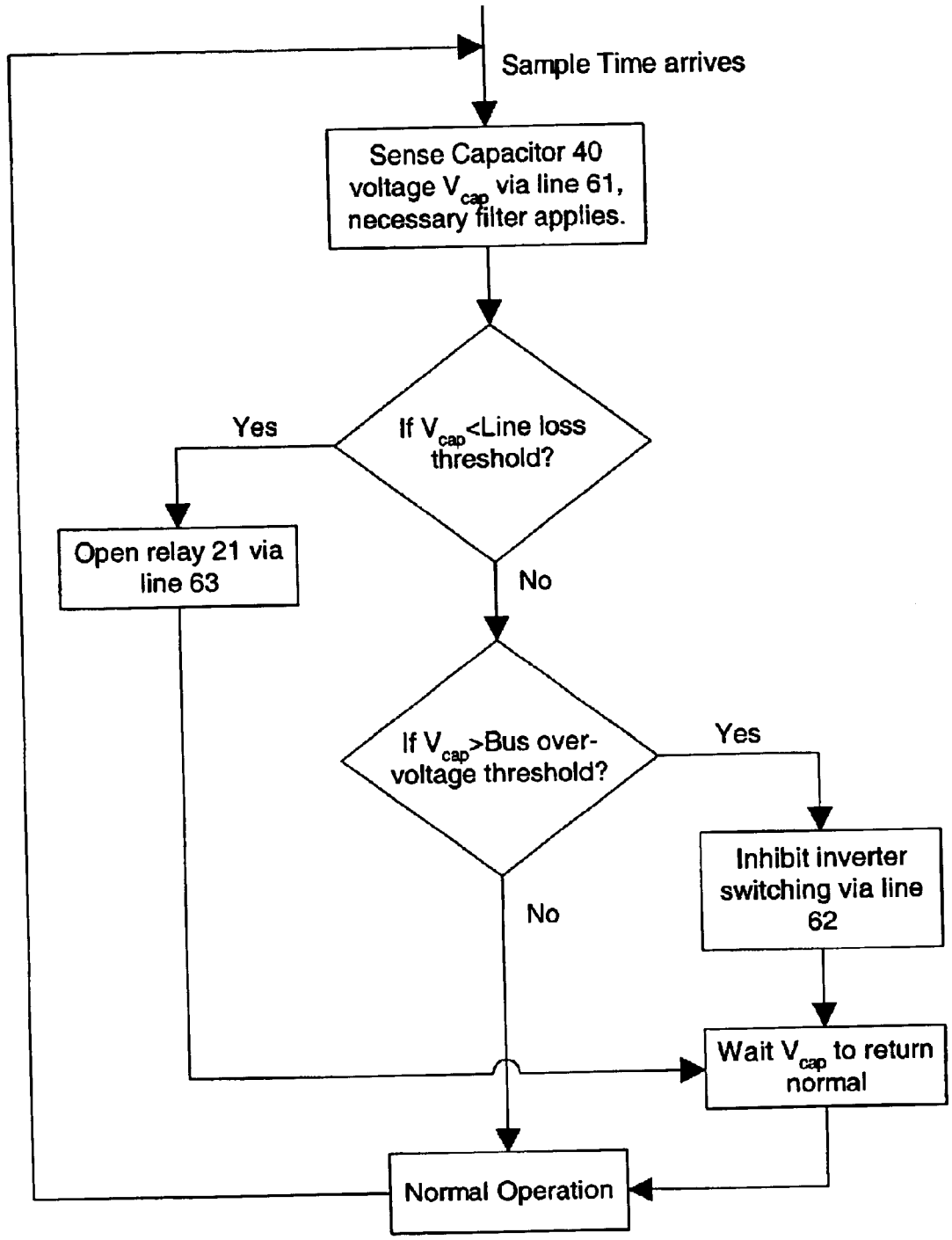
FIG. 4 is a preferred embodiment of the present invention on the controller function how to disconnect and connect the DC bus capacitor in case of over-voltage protection.

FIG. 4 illustrates the preferred embodiment of the present invention for features of controller 60 for fast converter protection by sensing DC link bus voltage across capacitor 40. The sampling frequency of this voltage is a fast loop within the controller, preferably within tens of microseconds. When sample time comes, voltage across capacitor 40 is sampled. Due to the requirement of fast sampling, feedback path from capacitor 40 should not present much delay (for example, preferably less than 1 micro-second). The sampled voltage $V_{cap}$ is compared to a line loss threshold. If $V_{cap}$ is less than the threshold, it indicates that AC power source 3 experiences a line loss. Controller 60 reacts to turn off relay 21 of FIG. 3. If $V_{cap}$ is not less than the line loss threshold, it continues to compare to a over-voltage threshold. If the comparison result indicates a bus over-voltage condition, controller 60 inhibits gating signals to switches within inverter 60 via line 62. Sequence of comparing $V_{cap}$ to line loss and bus over-voltage thresholds can be exchanged. After stopping energy coming from its source, controller 60 starts to monitor the bus voltage $V_{cap}$. When $V_{cap}$ recovers back to its normal range, normal operation of converter 1 is re-issued by controller 60.

A second AC/DC/AC embodiment of the present invention is illustrated in FIG. 5a. Converter 5 accepts three-phase AC power from source 3. The converter 5 consists of an AC input section 300. AC input section 300 further includes three-phase AC contactor and a three-phase inductor 304. AC source 3 connects to a three-phase AC precharge contactor 200. AC three-phase contactor 200 has two single phase contactors 201 and 202. Two resistors 203 and 204 are connected across these two contactors 201 and 202. When the AC power source 3 is first turned on, contactors 201 and 202 are open. Resistors 203 and 204 limit the inrush current to converter 5. Once the DC link bus voltage across capacitor 40 is charged up, contactor 201 and 202 are commanded to close from controller 60 via control line 63. It is understandable that the same precharge feature is preserved if contactors 201 and 202 and their associated resistors 203 and 204 are arranged to any two phases of three phase input lines 305–307. Normally a three-phase contactor with three single phase contacts is more readily available than one with two single phase contacts. In this case the third phase contact is inserted between input line 306 and inductor 302. For the same precharge function, another alternative to AC contactor 304 is to use a DC relay, as 20 from FIG. 3, between the diode rectifier 10 and capacitor 40. It is also possible to configure converter 5 to accept single phase AC power by replacing the three-phase input blocks 300 and 10 with 300b and 10b of FIG. 5b. Semiconductor switches from FIG. 5c and 5d can be used in place of 201 and 202.

Three-phase contactor 200 connects to a three-phase inductor 304 consisting of three single phase inductors 301–303. Three-phase inductor 304 is in the circuit for input current power factor improvement and blocking high switching frequency noise from entering to AC power source 3. Inductors 301–303 can be wound on a single magnetic core or common mode inductance can be provided through three independent cores. The precharge circuit 200 and three-phase inductor 304 can be also arranged as shown in FIG. 5e with inductor 304e in front of precharge circuit 200e. A three-phase diode bridge 10 is connected to this three-phase inductor 304. Construction of rectifier 10 from diodes 11–16 is the same as from FIG. 3. The single DC link capacitor 40 is connected to rectifier 10 directly. Capacitance selection of 40 still follows equation (1). In this embodiment capacitor 40 and three-phase AC inductor 304 form a filter effectively preventing high switching noise from going back to input lines 305–307.

Terminals from capacitor 40 are DC link bus terminals 73 and 74. Inverter 50 takes DC power from these two terminals 73 and 74. Controller 60 incorporates features from FIG. 4 for fast system protection and sends out commanding signals via 62 to inverter 50 for switch actions among switches 51–56. Regulated variable magnitude and frequency voltage is delivered to load 2 via output wires 84–86.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive. The scope of the invention will be indicated by the appended claims rather than by the foregoing description. And all changes, which come within the meaning and range of equivalency of the claims, are therefore intended to be embraced therein.

What is claimed is:

1. An AC/DC/AC power converter, comprising:

A rectifier having diodes, anode of one said diode connected to cathode of another said diode to form a phase leg, the middle node of said diode leg serves to accepts one input power line, the free cathode end of all said diode legs are tied as a positive terminal and free anodes of all legs are similarly tied together to serve as the negative terminal;

An inverter having switching semiconductors, with a free-wheeling diode connected across each said switching semiconductor to form a bi-directional current carrying switch-diode module, two said modules to form a leg, the middle node of said leg serves as an output terminal, free nodes of all legs with diode cathode to tie together to accept DC positive bus, free nodes of all legs with diode anode to tie together as negative terminal;

A DC link section with an inductor, a capacitor and a precharge means in series, said capacitor is constructed with film or ceramic materials, said capacitor terminals serve as DC output for said inverter;

A control means supplying signals capable of isolating said capacitor from input and output of said converter;

Whereby the capacitance of said capacitor in said DC link section is reduced and capacitor construction is simplified for compactness, endurance and reliability of said converter; The over-voltage transient is protected by fast reaction of said control means.

2. The AC/DC/AC power converter of claim 1, wherein said rectifier and said inverter are either three-phase or single phase circuits.

3. The AC/DC/AC power converter of claim 1, wherein said inductor of said DC link section comprises two parts, one part on the positive bus and the other part on the negative bus, said inductor possesses differential and common mode inductances.

4. The AC/DC/AC power converter of claim 1, wherein said precharge means of said DC link section further comprises a precharge resistor and a DC relay in parallel.

5. The AC/DC/AC power converter of claim 1, wherein said precharge means of said DC link section further comprises a precharge resistor and a semiconductor power switch in parallel.

6. The AC/DC/AC power converter of claim 1, wherein the location of said precharge means of said DC link section can be either before the inductor, between the inductor and the capacitor, on either positive or negative bus.

7. The AC/DC/AC power converter of claim 1, wherein said control means does fast sensing of said DC link capacitor voltage, isolates the capacitor from input source when said voltage is lower than a under-voltage threshold, from output load when said voltage is higher than an over-voltage threshold and returns said capacitor to normal operation when said voltage is in its normal range.

8. An AC/DC/AC power converter, comprising:

An AC section connecting an input power source to a rectifier;

Said rectifier having diodes, anode of one said diode connected to cathode of another said diode to form a phase leg, the middle node of said diode leg serves to accepts one input power line, the free cathode end of all said diode legs are tied as a positive terminal and free anodes of all legs are similarly tied together to serve as the negative terminal;

An inverter having switching semiconductors, with a free-wheeling diode connected across each said switching semiconductor to form a bi-directional current carrying switch-diode module, two said modules to form a leg, the middle node of said leg serves as an output terminal, free nodes of all legs with diode cathode to tie together to accept DC positive bus, free nodes of all legs with diode anode to tie together as negative terminal;

A DC link section with at least a capacitor, said capacitor is constructed with film or ceramic materials which capacitance is less than a few micro-farads;

A fast control means supplying signals capable of isolating said capacitor from input and output of said converter within a few micro-seconds;

Whereby the capacitance of said capacitor in said DC link section is reduced and capacitor construction is simplified for compactness, endurance and reliability of said converter; The over-voltage transient is protected by fast reaction and regulation of said control means.

9. The AC/DC/AC power converter of the claim 8, wherein said AC section t further comprises an AC precharge means and an AC inductor in series.

10. The AC/DC/AC power converter of claim 9, wherein said AC precharge means further comprises a resistor in parallel to an AC contact; Said AC contact can be constructed by either an AC contactor or semiconductor power switch; Said contact is opened during low DC bus voltage and closed when said DC bus voltage is high and in normal range.

11. The AC/DC/AC power converter of claim 9, wherein the location of said inductor can be either between the input power source and precharge means or between said precharge means and said rectifier.

12. The AC/DC/AC power converter of claim 8, wherein said AC section, said rectifier and said inverter can be either three-phase or single phase circuits.

13. The AC/DC/AC power converter of claim 8, wherein said DC link section further comprises of either a DC inductor or a DC precharge means.

14. The AC/DC/AC power converter of claim 8, wherein said control means does fast sensing of said DC link capacitor voltage, isolates the capacitor from input source when said voltage is lower than a under-voltage threshold, from output load when said voltage is higher than an over-voltage threshold and returns said capacitor to normal operation when said voltage is in its normal range.

* * * * *